US010250941B2

(12) United States Patent
Deen

(10) Patent No.: US 10,250,941 B2
(45) Date of Patent: Apr. 2, 2019

(54) SYSTEM AND METHOD FOR MAPPING AFFILIATED GRAPHS USING VIDEO FINGERPRINTS

(71) Applicant: NBCUniversal Media, LLC, New York, NY (US)

(72) Inventor: Robert Glenn Deen, Universal City, CA (US)

(73) Assignees: NBCUniversal Media, LLC, New York, NY (US); Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 15/377,758

(22) Filed: Dec. 13, 2016

(65) Prior Publication Data

US 2018/0167673 A1    Jun. 14, 2018

(51) Int. Cl.
| | |
|---|---|
| *H04N 7/173* | (2011.01) |
| *H04N 21/44* | (2011.01) |
| *H04N 21/234* | (2011.01) |
| *H04N 21/8358* | (2011.01) |
| *H04N 21/81* | (2011.01) |
| *H04N 21/2387* | (2011.01) |
| *H04N 21/472* | (2011.01) |
| *H04N 21/236* | (2011.01) |

(52) U.S. Cl.
CPC ..... *H04N 21/44008* (2013.01); *H04N 21/236* (2013.01); *H04N 21/2387* (2013.01); *H04N 21/23418* (2013.01); *H04N 21/23424* (2013.01); *H04N 21/47217* (2013.01); *H04N 21/8133* (2013.01); *H04N 21/8358* (2013.01)

(58) Field of Classification Search
CPC ......... H04N 21/44008; H04N 21/2387; H04N 21/23424; H04N 21/236; H04N 21/23418; H04N 21/47217; H04N 21/8133; H04N 21/8358
See application file for complete search history.

(56) References Cited

U.S. PATENT DOCUMENTS

| | | |
|---|---|---|
| 7,809,154 B2 | 10/2010 | Lienhart et al. |
| 7,979,570 B2 | 7/2011 | Chapweske |
| (Continued) | | |

FOREIGN PATENT DOCUMENTS

| | | |
|---|---|---|
| WO | 2016068760 | 5/2016 |
| WO | 2016118058 | 7/2016 |

*Primary Examiner* — James R Sheleheda
(74) *Attorney, Agent, or Firm* — Lee, Hong, Degerman, Kang & Waimey PC

(57) ABSTRACT

Systems and methods for mapping affiliated graphs using video fingerprints are disclosed. Some embodiments include receiving first media corresponding to a first package encoding of a video content; identifying a first set of frames of the first media and generating video fingerprints for the first media; receiving second media corresponding to a second package encoding of the same video content; identifying a second set of frames of the second media and generating video fingerprints for the second media; generating a mapping comprising alignment information of one or more frames of the first set of frames and one or more frames of the second set of frames; and outputting the generated mapping for determining a switch point for switching from the first package encoding to the second package encoding during display of the video content.

30 Claims, 10 Drawing Sheets

(56) References Cited

U.S. PATENT DOCUMENTS

| | | |
|---|---|---|
| 8,150,096 B2 | 4/2012 | Alattar |
| 8,849,044 B2 | 9/2014 | Ren et al. |
| 9,058,846 B2 | 6/2015 | Minder |
| 9,088,835 B2 | 7/2015 | Berger et al. |
| 9,236,093 B2 | 1/2016 | Tapper |
| 9,305,603 B2 | 4/2016 | Krishnamurthy et al. |
| 9,330,426 B2 | 5/2016 | Davis |
| 9,591,361 B2 * | 3/2017 | Nagaraj ......... H04N 21/234327 |
| 9,898,593 B2 * | 2/2018 | Sun ..................... G06T 1/005 |
| 2006/0044391 A1 * | 3/2006 | Mauger ............. G01R 13/0236 348/184 |
| 2009/0287841 A1 * | 11/2009 | Chapweske ......... H04L 65/4084 709/231 |
| 2011/0122315 A1 * | 5/2011 | Schweiger ......... H04N 21/2365 348/500 |
| 2012/0189212 A1 * | 7/2012 | Ren ................... G06F 17/30784 382/218 |
| 2012/0321181 A1 * | 12/2012 | Yang ................. G06K 9/00751 382/165 |
| 2013/0060911 A1 * | 3/2013 | Nagaraj ........... H04N 21/23432 709/219 |
| 2014/0085543 A1 * | 3/2014 | Hartley ................. H04N 9/87 348/584 |
| 2014/0267779 A1 * | 9/2014 | Schmidt ............ G06K 9/00758 348/180 |
| 2016/0057317 A1 * | 2/2016 | Zhao ................. H04N 21/4627 348/515 |
| 2016/0133299 A1 * | 5/2016 | Yalniz ................. G11B 27/036 386/241 |
| 2017/0244999 A1 * | 8/2017 | Chen ................... G06F 17/3002 |

* cited by examiner

550 ⇘

| PE1 - PE2  MAP |
| --- |
| PE1:A::1, PE2:D::1 |
| PE1:A::3, PE2:D::4 |
| PE1:A::5, PE2:D::7 |

SYSTEM AND METHOD FOR MAPPING AFFILIATED GRAPHS USING VIDEO FINGERPRINTS

BACKGROUND

Consumers of video want the highest quality experience possible, including video at the highest resolution, the lowest compression, with the clearest image quality. However, the highest quality video requires transmitting large amounts of data at high rates with low latency and no packet loss. Most Internet connections are not capable of streaming video at its highest resolution and data rates due to bandwidth limitations. To overcome such limitations, various practices in the related art include encoding video at a variety of quality levels or bit rates, while minimizing effect to the viewer and/or content to allow the video to be enjoyed over a wide variety of Internet connection speeds.

Adaptive bit rate (ABR) streaming is one such known technique for streaming digital video over the Internet in situations involving limited bandwidth. The ABR streaming technique, such as MPEG-DASH, involves encoding a video into multiple different encodings, each at a different bit rate. Encodings at higher bit rates represent better video quality at the cost of more data which requires higher bandwidth to transmit. The video is typically broken up into chunks or shards, each containing a small portion of the video, each often corresponding to a few seconds. Thus, each encoding is created such that there are common shared points, also referred to as I-frames, which are aligned across all bitrate encoding, where each I-frame corresponds to a shard of the video. These I-frames permit seamless switching between different bit rate encoding streams without missing any shards of the video.

Video playback using the ABR technique involves selecting one of the bit rate encodings and attempting to transport the data over the available network. If the network is unable to transport the selected encoding at a rate which enables smooth playback, a lower bit rate encoding is selected and the video playback is transitioned at the next I-frame switch point. If it is determined that the network is able to transport the selected encoding at a rate which enables smooth playback, then the same encoding is continued to be selected, or a higher encoding is selected and transitioned at the next I-frame switch point.

At the time of encoding, the shards are broken and organized such that the playback device can switch to a different encoding level from a current encoding level by requesting the next shard of data of the different encoding level starting with the I-frame corresponding to the next I-frame of the current encoding. To facilitate this, the video file is often encoded by an encoder to produce two or more different quality encodings with each encoded version being broken up into shard files with aligned I-frames, and each shard following an iterative or logical naming scheme identifying the encoding and shard number. Therefore, in most applications, the playback device can merely iterate or cycle through the naming scheme of the encoding and shard addresses to receive a different encoding level or to request and receive the next shard for buffering and playback.

However, this limits the playback device to receiving encodings from only one encoding source, which provides encoder-specific package encodings comprising various bit rate encodings. Since encoding sources often have no affiliation or coordination with one another different encoding sources often include package encodings which are broken up and/or named differently. Thus, an encoding of a video from one package encoding will likely have shards and I-frames which either do not align, or are incompatibly formatted with the shards and I-frames of another encoding of the same video from another package encoding. Thus, even if the video content selected to be played on the playback device is available from a large number of other package encodings via the Internet or other content source, thereby providing a large number of different encoding levels and options for playback, the playback device is able to only utilize the encodings of a single package encoding.

Given the ever expanding amount of content available to connected devices, the inability to fully utilize the available content information hampers the end user experience as devices are simply unable to provide content in the maximum or most optimum quality possible. Additionally, content providers may need to redundantly generate and provide package encodings of content at one or more particular encoding levels, even if the particular encoding levels for the same content are available from another package encodings, simply because playback devices are unable to switch between package encodings due to differences in naming conventions, shard and I-frame alignment, and the like, as discussed.

Thus, the existing systems and methods are unable to provide playback devices with the ability to maximally utilize video information from different package encodings of the same underlying video content. Therefore, it may be advantageous for a system and method to analyze affiliated content networks and package encodings to generate a mapping of aligned I-frames between two or more different package encodings.

SUMMARY

Embodiments of the present disclosure include a system and method for mapping affiliated video content graphs using digital video fingerprints. In some embodiments, the mapping of affiliated content may be generated in advance prior to playback of the video content. The mapping may be utilized by playback devices to determine a playback plan for the video content. In other embodiments, the mapping may be utilized in response to an event requiring a change in encoding playback, such as a change in network availability requiring a lower encoding level for playback.

The mapping may be generated using invariant video fingerprints of each encoding to determine matching frames or I-frames of each package encoding. Matching I-frames across package encodings may present opportunities for playback devices to switch between package encodings. In some embodiments, a generated mapping may correspond to a simple list identifying shards of each package encoding having aligned I-frames. The mapping may include affinity information for all encodings available from each package encoding, or in other embodiments the mapping may include affinity information for one encoding, or for all encodings, as multiple encodings within one package encoding may have the same I-frames and shard alignments.

An embodiment of a method of the present disclosure includes receiving first media corresponding to a first package encoding of a video content to be output; identifying a first set of frames of the first media and generating video fingerprints for the first media based on the first set of frames; receiving second media corresponding to a second package encoding of the same video content to be output; identifying a second set of frames of the second media and generating video fingerprints for the second media based on the second set of frames; generating a mapping comprising alignment information of one or more frames of the first set of frames and one or more frames of the second set of frames based on the generated video fingerprints for the first media and the generated video fingerprints for the second media; and outputting the generated mapping for determining a switch point for outputting the video content using the first package encoding and switching to outputting the video content using the second package encoding during output of the video content.

A system according to an embodiment of the present disclosure may include a communication unit configured to receive and transmit information; and one or more processors configured to: receive, via the communication unit, first media corresponding to a first package encoding of a video content to be output; identify a first set of frames of the first media and generating video fingerprints for the first media based on the first set of frames; receive, via the communication unit, second media corresponding to a second package encoding of the same video content to be output; identify a second set of frames of the second media and generating video fingerprints for the second media based on the second set of frames; generate a mapping comprising alignment information of one or more frames of the first set of frames and one or more frames of the second set of frames based on the generated video fingerprints for the first media and the generated video fingerprints for the second media; and output the generated mapping for determining a switch point for outputting the video content using the first package encoding and switching to outputting the video content using the second package encoding during output of the video content.

BRIEF DESCRIPTION OF THE DRAWINGS

The above and other aspects and features of the present disclosure will become more apparent upon consideration of the following description of embodiments, taken in conjunction with the accompanying drawing figures.

DETAILED DESCRIPTION

In the following detailed description, reference is made to the accompanying drawing figures which form a part hereof, and which show by way of illustration specific embodiments of the present invention. It is to be understood by those of ordinary skill in this technological field that other embodiments may be utilized, and that structural, electrical, as well as procedural changes may be made without departing from the scope of the present invention. Wherever possible, the same reference numbers will be used throughout the drawings to refer to the same or similar parts.

Embodiments of the present invention relate to a system and method for affiliated content graph mapping using video fingerprints. In this disclosure, the content will be discussed primarily with respect to streaming media such as internet streaming video, however, various applications of the systems and methods disclosed herein to other media are contemplated, including, but not limited to television, radio, digital video recorder media, internet radio, internet video, other forms of streaming content, virtual reality content, and the like.

Figure 1:
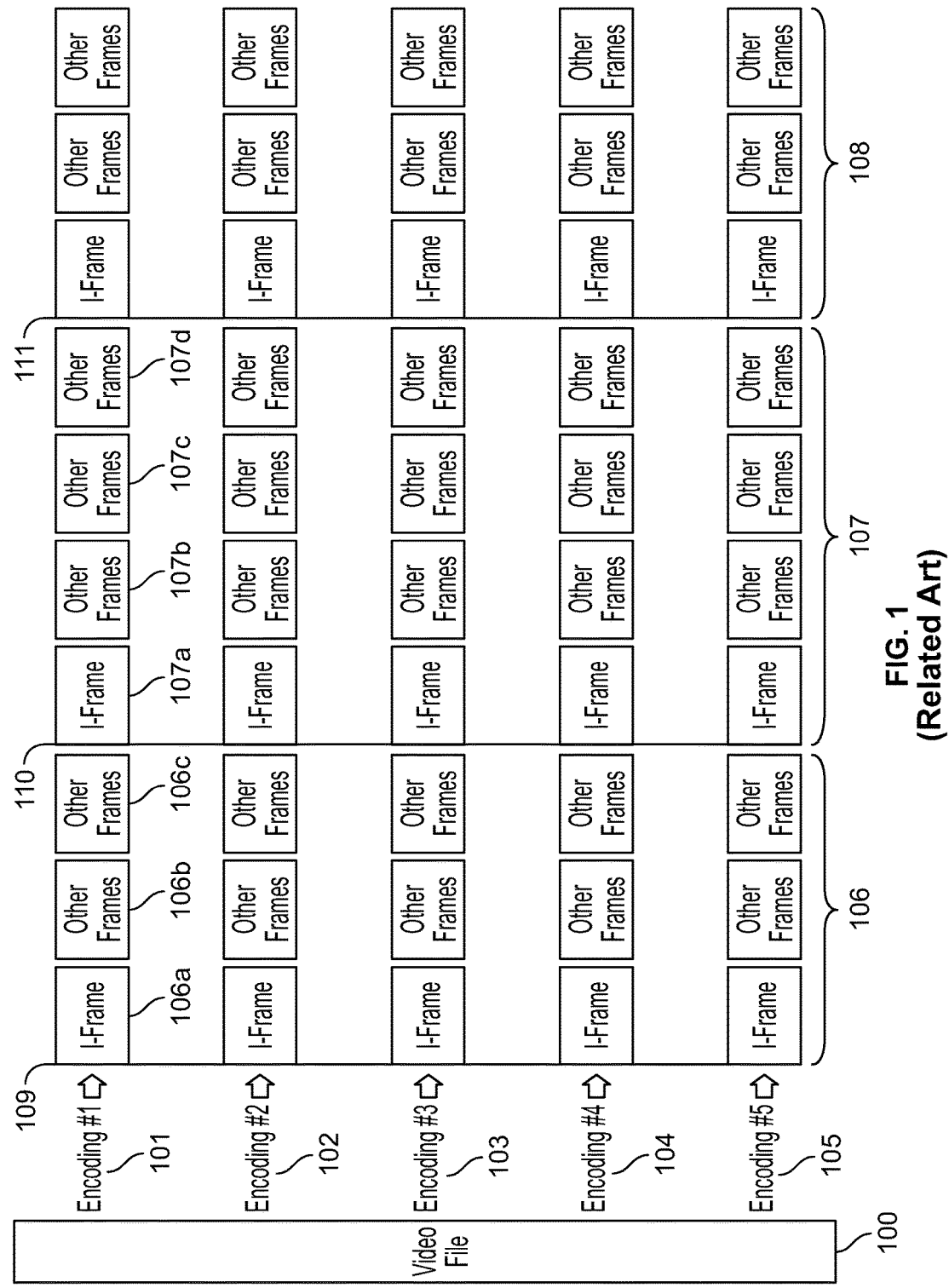
FIG. 1 is an illustration of a portion of video encoded into multiple bit rate encodings according to the related art.

FIG. 1 shows a block diagram showing various encoding data of media content 100, as known in the related art. In adaptive bit rate implementations, an encoder (not depicted) will encode an item of media content 100, such as a movie file. The encoder may be configured to encode the media content at different bit rates to produce multiple encodings 101, 102, 103, 104, 105 of the same media file to produce a package encoding of the media file. The resulting encodings will thus have different file sizes based on the level of bit rate encoding, which refers to the number of bits that are processed per second, often expressed as kilobits per second (kbps).

As is generally known, a higher bit rate encoding during compression will result in a higher quality video or audio file as more information of the video or audio is provided. Lower quality bit rate encodings may result in loss of information in the video or audio which may be noticeable to a user, such as motion blur, low dynamic range, detail clipping, and the like. Different bit rates may be used for the audio and the video aspects of a single item of media content. While this disclosure contemplates implementing the system for audio, video, or a combination of audio and video, for the purposes of this discussion, a total bit rate will be discussed, which represents a total number of the audio and video encoding bit rates.

Referring back to FIG. 1, the encoder may encode the media content 100 at five different bit rates. For example, Encoding 1 (101) may correspond to encoded data at 1800 kbps, Encoding 2 (102) may correspond to encoded data at 1200 kbps, Encoding 3 (103) may correspond to encoded data at 800 kbps, Encoding 4 (104) may correspond to encoded data at 500 kbps, and Encoding 5 (105) may correspond to encoded data at 256 kbps. The bit rates and encodings discussed with respect to FIG. 1 are by way of example only, and it will be understood that the number of encodings and encoding bit rates may vary in different embodiments of the present disclosure.

The encodings 101-105 may be broken up in to one or more segments, referred to as framesets, shown only by way of example by 106, 107, 108. Each of the framesets may be identified by a leading I-frame. For example, the frameset 106 of Encoding 1 (101) may be identified by an I-frame 106*a*, the frameset 107 of encoding 101 may be identified by an I-frame 107*a*, and so on. The I-frames may align with jump points 109, 110, 111 which correspond to the boundary between the framesets 106, 107, 108. The framesets 106, 107, 108 further include other frames 106*b*, 106*c* which may contain the encoded data corresponding to the video, audio, or other information of the media content being presented.

According to encoding implementations of the related art, at the beginning of the media content, a playback device, also referred to as a client terminal, may request the first frameset of one of the bit rate encodings 101-105 of the media content based on information received in a manifest, which lists the available encodings and the addresses of servers from which the playback device can retrieve the framesets of each encoding. The client terminal may select the first frameset at the highest available encoding, Encoding 1 (101), the lowest available encoding, Encoding 5 (105), or may select the first frameset based on various other factors such as a random selection, a previously selected bit rate encoding level, or the like. The client terminal may send a request to the server for one or more framesets of the selected encoding, and may receive information related to an address where the one or more framesets are available for retrieval, or may alternatively receive the requested one or more framesets directly from the video server. Once the requested framesets are received, the client terminal decodes the encoded data via a decoder provided at the client terminal and prepares the decoded data for playback via an output, such as a display.

The client terminal may attempt to smooth out the playback by use of a video buffer provided at the client terminal. The client terminal may load the video buffer with as many framesets of the selected encoding as the buffer will hold. For smooth playback, the fill rate of the video buffer may need to be as fast, or faster, than the read rate of the video decoder rendering the video to the output. However, if the video buffer fill rate is unable to meet the read rate of the video decoder, the playback may become choppy or delayed while the necessary framesets are retrieved and/or received and readied for decoding and playback.

To ensure smooth playback, the client terminal may monitor and manage the video buffer to ensure that framesets are available when the client terminal is ready to read and decode them for playback. If it is detected that the video buffer fill rate is unable to meet the read rate of the video decoder, the client terminal may determine that the available bandwidth cannot support the selected bit rate encoding level as the file sizes of the framesets are too large. In this case, the client terminal may use the manifest information to select a lower bit rate encoding level than the currently selected bit rate encoding level, and request the next frameset at the lower bit rate encoding level. Throughout the duration of the media content, the client terminal may repeatedly request the video server with a manifest for information on available encoding files, or the video server may alternatively repeatedly provide the client terminal with the manifest information.

Once the next frameset at the lower bit rate encoding level is received, the client terminal may switch to decoding and playback of the next frameset at the jump point, for example 110 or 111. Since all the framesets 106, 107, 108 of each encoding 101-105 from the same package encoding are aligned at the same jump points 109, 110, 111, the client terminal can switch to receiving, decoding, and presenting playback of a lower bit rate encoding level without loss of any frames of the media content, and the transition of one bit rate encoding level to another is mostly seamless to the viewer.

During playback, if the client terminal detects that the video buffer fill rate exceeds the read rate of the decoder, the client terminal may determine that the available bandwidth can support a higher quality video stream, and thus switch to a higher bit rate encoding level. For example, if the client terminal is receiving encoded data for Encoding 4 (104) and the client terminal determines that the video buffer fill rate is higher than the read rate of the decoder, the client terminal may send a request to the server for Encoding 3 (103). If the available bandwidth is again sufficient to provide a high video buffer fill rate, the client terminal may repeatedly request a higher bit rate encoding level until a maximum available bit rate encoding is reached, or until the client terminal determines that the available bandwidth cannot support a higher bit rate encoding level.

Figure 2:
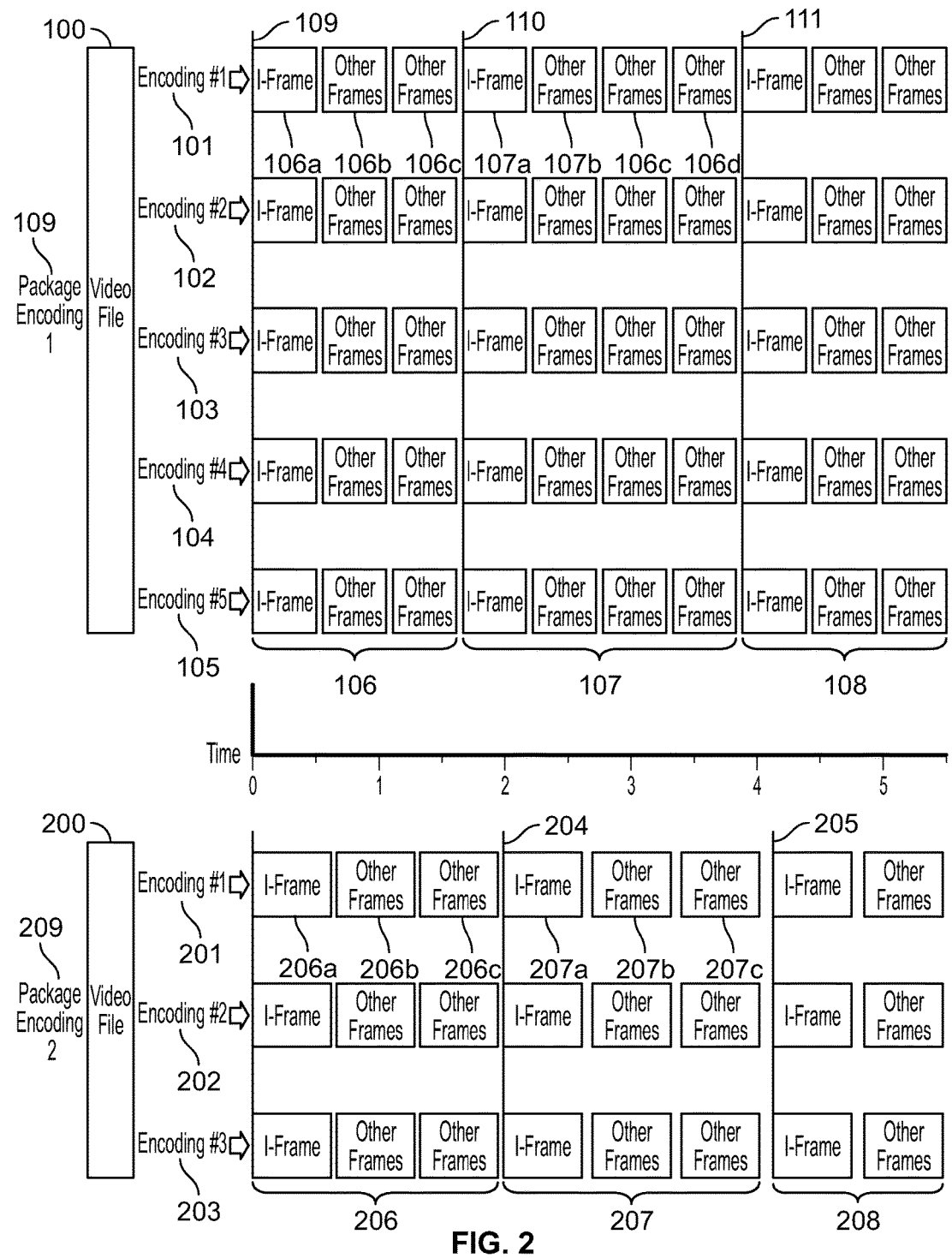
FIG. 2 is an illustration of portions of video encodings from different package encodings according to the related art.

While the client terminal is able to seamlessly switch between multiple encodings of a single package encoding provided by a content source, the client terminal of the related art is unable to switch between encodings of different package encodings as the encoded files will be incompatible due to, for example, misalignment of I-frames and framesets. Referring now to FIG. 2, various encodings of two different package encodings 109, 209 are shown. The package encodings 109, 209 may each provide multiple encodings corresponding to the same underlying video content 100, 200, for example a movie, television show, online video, and the like. Package encoding 2 209 may provide three different encodings 201, 202, 203, which are encoded at encoding levels which are different from the encodings of package encoding 1 109. For example, encodings 201, 202, 203 of package encoding 2 209 may be of even higher quality than the encodings 101, 102, 103, 104, 105 of package encoding 1 109. However, as the encodings of package encoding 2 were encoded using a different encoder with different encoding settings from those of package encoding 1, the I-frames, for example 206a, 207a, and framesets, for example 206, 207, 208, of package encoding 2 do not align with those of package encoding 1. For this reason, a playback device is unable to switch between encodings between the package encoding.

For example, if the playback device is currently receiving and decoding files of frameset 106 of encoding 5 105, and it is determined that the connection bandwidth can support a higher quality encoding level to increase video quality, the playback device is unable to switch to a high quality encoding 1 201 of package encoding 2 because the next I-frame and jump point 110 of package encoding 1 does not align with any I-frame and jump point of package encoding 2. If the playback device were to attempt to switch to encoding 1 201 at jump point 110, it would receive frameset 207 starting with I-frame 207a, and a chunk of content from jump point 110 to jump point 204 would be missing during playback to the viewer.

Figure 3:
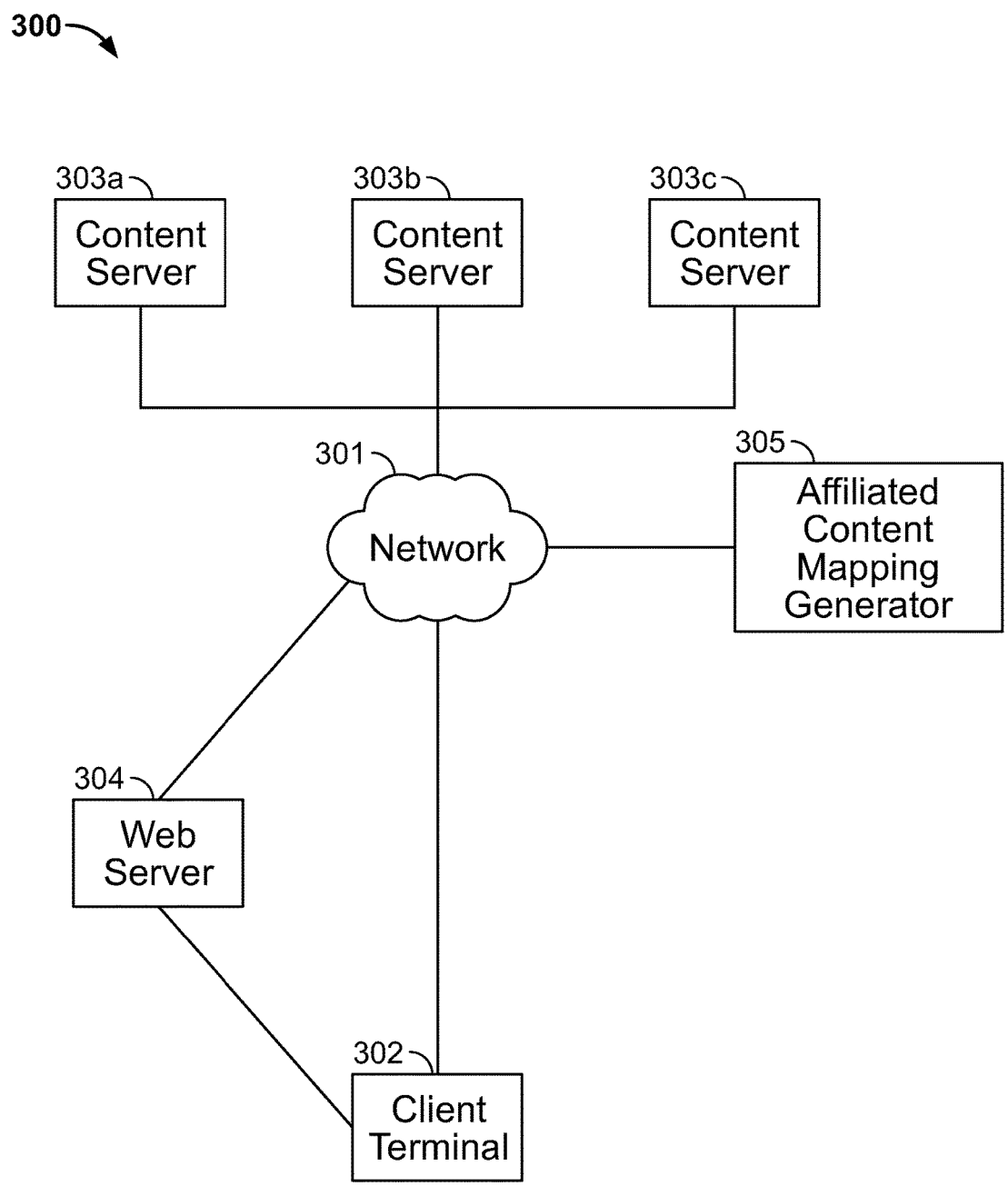
FIG. 3 is an illustration of a system for mapping affiliated content graphs using video fingerprints in accordance with an embodiment of the present disclosure.

Referring now to FIG. 3, a system 200 for mapping affiliated content networks using video fingerprinting according to an embodiment of the present disclosure is shown. The system 300 may include any type of system that transmits data packets over a network 301. For example, the system 300 may include a client terminal 302 such as a mobile terminal accessing streaming media data provided by one or more content servers 303a, 303b, 303c (sometimes referred to singularly or collectively as 303) via a network 301, such as the Internet. The system 300 may also include a gateway (not depicted), for example a server, a router, a firewall server, a host, a proxy server, request redirector, and the like.

The network 301 may include various systems for distribution of content including any desired combination of hardwired and wireless communication links, including wide area networks (WAN), local area networks (LAN), wireless networks suitable for packet-type communications, over-the-air, cable, internet, other network connection systems, and the like, which implement networks and hardware known and used in the related art, including broadcast technologies, cable or satellite distribution systems, internet protocol (IP), or other networked technologies, and the like, wherein examples of the content include live and recorded television, movies, internet streaming video and audio, music, radio or other audio-visual content, and the like. Although not depicted, it will be understood that the network 301 may interconnect some or all of the elements of the system 300, and all elements may be configured to communicate and transmit data via network 301, or other communication network implementation as discussed above.

The client terminal 302 may be connected to the network 301. The client terminal 302 may be a hardware component including software code and applications which are configured to allow the client terminal to communicate, transmit, request, and receive data packets via the network 301 which may correspond to streaming media data. The client terminal 302 may include any terminal or system configured to receive a content signal, and in some embodiments, the client terminal 302 may be configured to decode received content data and prepare the content for presentation to a user via an output such as a display, audio speaker, or the like. The output may be implemented in the same hardware as the client terminal 302, or in some embodiments, the output may be implemented in a separate hardware or location from the client terminal 302.

For example, the client terminal may correspond to an Internet video streaming device, which is configured to request, transmit, and receive data packets corresponding to Internet streaming video, and the client terminal may be further configured to decode received data packets and prepare the media content to be displayed via a separate output, such as a television. In some embodiments, the client terminal 302 may also be configured to transmit information to one or more other aspects of the system 300 via the network 302 regarding the content data received and decoded by the client terminal 302.

Various embodiments of the client terminal 302 may include televisions, desktop computers, laptop computers, tablet computers, mobile smartphones, personal media devices, wearable devices, set top box receivers, streaming internet content devices, satellite television receivers, and the like. In other embodiments, the client terminal 302 may be implemented in more than one connected device. Embodiments of the client terminal 302 further include a wide range of wireless mobile terminals, such as smartphones, as wireless transmission of media content may further emphasize the need to map affiliated content graphs to utilize multiple package encodings since network data transmission rates may be less reliable and have lower bandwidth, or include maximum data transmission caps.

The content servers 303 of the system 300 may include a memory and be configured to store and host data of various media content, including video, audio, and the like, and store and host multiple package encodings of video and audio content from various content sources. The content data may include stored content data corresponding to various versions of bit rate encodings of the media content as well as various package encodings corresponding to different content sources. As discussed, each package encoding may break up video content into a sequence of encoding-specific file segments, where each segment includes an interval of playback of the media content. Each file segment, otherwise referred to as a frameset, may have the same interval length as corresponding framesets of other encoding versions at a different bit rate within the same package encoding, however framesets across different package encodings may not, and typically will not, align or be congruent to each other.

Thus, the system 300 may further include multiple encoders (not depicted) configured to generate bit rate encodings of the media content for various package encodings. The encoders may be implemented at each content server 303a, 303b, 303c, or many may be implemented at each content server by multiple content sources and content providers, or the encoders may be implemented separately in the system. Further, the encoders may be connected to the network 301 to communicate, request, receive, and/or transmit media content information, including encoded data resulting from encoding the media content.

In the embodiment of FIG. 3, the system 300 may further include a web server 304 connected to the network 301. The web server 304 may be configured to receive requests from the client terminal 302 for media content, and provide information to the client terminal 302 in response to a request, including providing data associated with the media content or address information for retrieving files of the media content. It will be understood that web server 304 may be configured to provide information, data, and media content other than video, including audio, text, metadata, and the like, and embodiments of the disclosure are not limited.

For example, web server 304 may be an enterprise server, a media server, a mobile data server, or any other type of server. In some embodiments web server 304 may be a computer or a computer program responsible for accepting requests (e.g., HTTP, RTSP, or other protocols that can initiate a media session) from client terminal 302 and serving client terminal 302 with streaming media. Further as shown in FIG. 3, embodiments are considered where the client terminal 302 is configured to transmit and receive data directly to and from the content servers 303 via network 301 without passing data through the web server 304. For example, the client terminal may be provided with content host address information associated with a content server 303 and the client terminal may query and receive content and data directly from content server 303 without passing data through the web server 304.

The system 300 may further include an affiliated content mapping generator 305 configured to process content encodings available from various package encodings on content servers 303a, 303b, 303c. In one embodiment, the affiliated content mapping generator 305 may receive two encodings from different package encodings from the content servers 303 and generate a map having information on alignment of I-frames between the package encodings. The affiliated content mapping generator 305 may utilize invariant video fingerprinting techniques to determine whether two I-frames of two different package encodings are identical, or similar enough to support a switch form one package encodings to another, as discussed further herein.

In some embodiments, the affiliated content mapping generator 305 may be connected to the network 301 and configured to provide client terminal 302 with mapping information related to video content that is being received at the client terminal 302 from a content server 303. The affiliated content mapping generator 305 may be associated with a specific content server 303 and a corresponding content source providing a package encoding. In these embodiments, the client terminal 302 may send metadata information to the affiliated content mapping generator 305 related to a current video content being played or requested to be played at the client terminal 302 from the particular content source and corresponding package encoding. In some embodiments, the system 300 may include multiple affiliated content mapping generators 305 implemented at each content server 303, and in other embodiments each content source on each content server 303 may implement a separate affiliated content mapping generator 305 to generate and provide source-specific content mapping information.

In embodiments where the client terminal 302 sends metadata of the video content selected for playback, the affiliated content mapping generator 305 may receive the metadata information and retrieve information of additional package encodings from content servers having the same video content available. In these embodiments, the system 300 may further include a content retriever, not depicted, which is configured to retrieve additional encodings from various package encodings which correspond to the selected video content. The affiliated content mapping generator 305 may further include or be operatively connected to a memory and may be configured to generate affiliated content mapping data, as discussed further herein, and store the generated mapping data to the memory for access by the client terminal 302. In other embodiments the affiliated content generator 305 may be configured to process package encodings in real time as requests from the client terminal 302 are received, and to provide affiliated content mapping data to the client terminal 302 for playback of available encodings.

In other embodiments, the affiliated content mapping generator 305 may be implemented with the client terminal 302, connected to the client terminal 302, or operatively in communication with the client terminal 302 via a network such as 301. In these embodiments, the affiliated content mapping generator 305 may be configured to utilize metadata of a selected video content for playback at the client terminal 302 to retrieve encodings of the same video content from different package encodings from content servers 303a, 303b, 303c.

In other embodiments, the affiliated content mapping generator 305 may be provided with a primary video content and a secondary video content for processing and generation of affiliated content mapping data. The generated affiliated content mapping data may then be stored in a memory of the affiliated content mapping generator 305, or may be stored in a memory of the content server 303 for query and retrieval by the client terminal 302 during playback of the video content. In such embodiments, the entity maintaining the primary content at a content source may cause the affiliated content mapping generator 305 to process and generate affiliated content mapping data for all content available at the content source in order to build up a database repository of affiliated content mapping data with respect to other package encodings available from other content sources.

Figure 4:
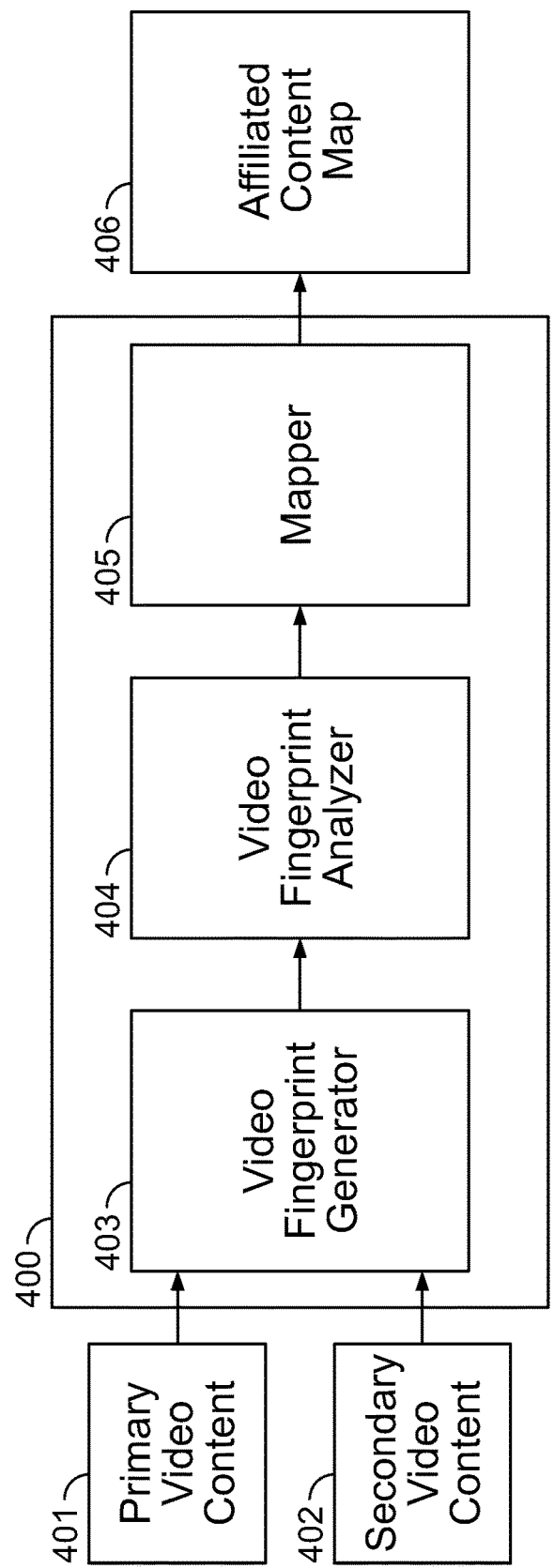
FIG. 4 is an illustration of an affiliated content mapping generator according to one embodiment of the present disclosure.

Referring now to FIG. 4, a diagram showing an embodiment of the affiliated content mapping generator 400 is depicted. The affiliated content mapping generator 400 may receive information of primary video content 401 to be played at the client terminal. The information may include metadata of the primary video content, source address information for retrieving media files of the primary video content, encoded files of the primary video content, and/or decoded files of the primary video content. In some embodiments, the affiliated content mapping generator 400 may include a decoder (not depicted) configured to decode the primary video content encoding for processing, or a decoder may be separately provided to decode the primary video content and provide the decoded primary video content to the affiliated content mapping generator 400.

The affiliated content mapping generator 400 may also receive information of secondary video content 402, where the primary video content 401 and the secondary video content 402 corresponds to the same underlying video content. The information may include metadata of the secondary video content, source address information for retrieving media files of the secondary video content, encoded files of the secondary video content, and/or decoded files of the secondary video content. In some embodiments, the affiliated content mapping generator 400 may include a decoder (not depicted) configured to decode the encoded secondary video content for processing, or a decoder may be separately provided to decode the encoded secondary video content and provide the decoded secondary video content to the affiliated content mapping generator 400.

The primary video content 401 and the secondary video content 402 may correspond to different package encodings of the same underlying video content. In other embodiments, the primary video content 401 and the secondary video content 402 may correspond to decoded analog information of two different package encodings of the same underlying video content.

Although not depicted, in some embodiments the information of the primary video content may be input to a content retriever of the affiliated content mapping generator 400. Using metadata of the primary video content 401, the content retriever may query content servers via a network, as discussed with respect to FIG. 3, for other package encodings which correspond to the same primary video content. The content retriever 402 may receive information related to alternate encodings from other package encodings (such as secondary video content 402), including metadata of other encodings, source address information for retrieving media files of the alternate encodings, encoded files of the alternate encodings, or decoded files of the alternate encodings.

As previously discussed in other embodiments, the affiliated content mapping generator 400 may receive primary video content 401 and secondary video content 402 in different ways, including a content provider inputting both primary and secondary video content 401, 402 for real time generation and transmission, or processing and generation of the affiliated content mapping data for storing in a memory (not depicted) of the affiliated content mapping generator 400.

As previously discussed, since encodings are often created by parties that have no connection with each other, no coordination is done during encoding the same video content for different package encodings. The encodings for other package encodings, such as the secondary video content 402, may be encoded at different bit rates and have different quality levels than the encoding for the primary video content. They may also differ in that they were encoded using different codecs (for example, MPEG2 vs. MPEG4), different resolutions (for example, standard definition vs. high definition vs. 4K), different languages, different edits (some material added or removed), or even where the encodings are identical but were assigned different encoding and shard addresses and address formats. The encodings of other package encodings may be provided by other content sources which are encoded differently than the primary video content 401, and thus the client terminal may be unable to effectively switch between the encoding of the primary video content and the encodings of the other package encodings, such as secondary video content 402. The encodings of the other package encodings may be desired by the client terminal as the current package encoding may have limited encodings of the video content.

In some cases, the encodings of other package encodings, such as secondary video content 402, may be encoded with higher quality, such as 4K video. In other cases, lower quality alternate encodings may be desired by the client terminal, for example where the client terminal corresponds to a mobile device such as a smartphone, and the mobile connection bandwidth of the device becomes limited during playback of the primary video content 401. This may occur if the mobile device is transitioned from a Wi-Fi network connection to a mobile broadband connection, or where a mobile broadband service subscription of the mobile device imposes a bandwidth limit or data transmission cap. If the current package encoding of the selected video content does not provide a low enough bit rate encoding for the encoded files to be effectively transmitted via the mobile connection bandwidth, the client terminal may be forced to stop playback of the video content while additional framesets of the current encoding is received and inserted into the buffer. Thus, lower bit rate encodings from other package encodings may be desired.

Referring back to FIG. 4, the decoded files of the secondary video content 402 may be provided to the fingerprint generator 403, along with the decoded files of the primary video content 401. The fingerprint generator 403 may be configured to process each of the decoded files and generate video fingerprints. In one embodiment, the fingerprint generator 403 may utilize invariant video fingerprinting techniques to process frames of the decoded primary video content and the secondary video content. In an embodiment, the fingerprint generator 403 may generate video fingerprints for only the I-frames of the decoded video files, or may generate video fingerprints for all frames of the decoded video files, or may generate video fingerprints for a selected number of frames, such as every other frame or every 10 frames, of the decoded video files. In one embodiment, the affiliated content mapping generator 400 may further include an I-frame extractor (not depicted) configured to extract I-frames of the primary video content 401 and the secondary video content 402 for processing by the fingerprint generator 403.

The fingerprint generator 403 may utilize digital video fingerprint techniques known in the related art, whereby the fingerprint generator 403 identifies, extracts, and compresses characteristic components of a video for unique identification based on resulting fingerprint data. The fingerprint generator 403 may generate invariant digital video fingerprints which are based on the content of the video itself, thereby making the fingerprint capable of uniquely identifying video content despite changes in the video file or accompanying metadata, including changes in aspect ratio, resolution, blurring, rotation, cropping, encoding level, and the like.

In some embodiments, the fingerprint generator 403 may analyze the decoded files and generate fingerprint data based on an extracted signature of one or more frames. The extracted signature of the video fingerprint data may be based on one or a combination of a color dimension (color or grey-level properties of frames, such as histogram, hue, saturation, and the like); a spatial dimension (distribution of color or arrangement of objects and identified pixels or groupings of pixels inside frames); and a temporal dimension (changes among frames or order of frames within a grouping of frames, such as specific motion detection). Further, the extracted signature may be based on global information of the entire frame, and in other embodiments the extracted signature may be based on local information within the frame, such as an interest point of pixels or motion point of a group of pixels across frames. Other signature extraction techniques known to those of ordinary skill in the art are considered by and included by reference in this disclosure.

As discussed, the fingerprint generator 403 may generate fingerprint data for each of the I-frames of the primary video content 401 and the secondary video content 402. In some embodiments, the fingerprint data for the primary video content 401 may already be available for retrieval from a memory and provided by the content server, and the fingerprint generator 403 may not need to generate fingerprint data for the known primary video content 401. Once invariant fingerprint data is generated by the fingerprint generator 403 for the primary and secondary video content 401, 402, the fingerprint data may be provided to the video fingerprint analyzer 404. The video fingerprint analyzer 404 may be configured to compare the generated fingerprint data for the primary video content and the secondary video content to determine whether there is any correspondence or alignment of any of the frames, or to determine an amount of offset between the frames.

For example, referring back to FIG. 2, the video fingerprint analyzer 404 may compare fingerprint data of the I-frames of package encoding 1 109 to fingerprint data of the I-frames of package encoding 2 209. One I-frame of package encoding 1 109 at a time may be compared with the fingerprint data of all I-Frames of package encoding 2 209 to determine any correspondence. In another embodiment, corresponding I-frames of each package encoding may be compared in order using fingerprint data. In yet other embodiments, the frame analyzer may compare all frames of each package encoding to determine which frames correspond to each other. In this case, the frame analyzer may also determine an offset value by which the I-frames of the package encoding are shifted from each other.

In some embodiments, the frame analyzer may determine that two I-frames correspond to each other when the fingerprint data of the two frames are identical. In other embodiments, the frames may be determined to correspond when a similarity factor of the fingerprint data is equal to or greater than a threshold similarity level. When the frame analyzer determines that two frames are identical or sufficiently correspond, information of the frames of each package encoding is provided to the mapper 406. The provided information may include identifying data of the correspondence, including the frame ID of each package encoding, I-frame ID, frameset ID, shard address, timestamp of the frames or shards, and the like, or a combination thereof.

The mapper 405 may be configured to generate an affiliated content map 406 including information of the package encoding and aligned frames. In one embodiment, the generated affiliated content map 406 may comprise a list including entries identifying the package encoding, followed by pairs of shard or I-frame addresses which identify the shards or I-frames in each encoding that are aligned. This generated map 406 may be output by the affiliated content mapping generator 400 for use by the client terminal in playback of the primary video content, or may be output to be stored in a memory to be accessed or for generation of a playback manifest to be transmitted and utilized during playback.

Figure 5A:
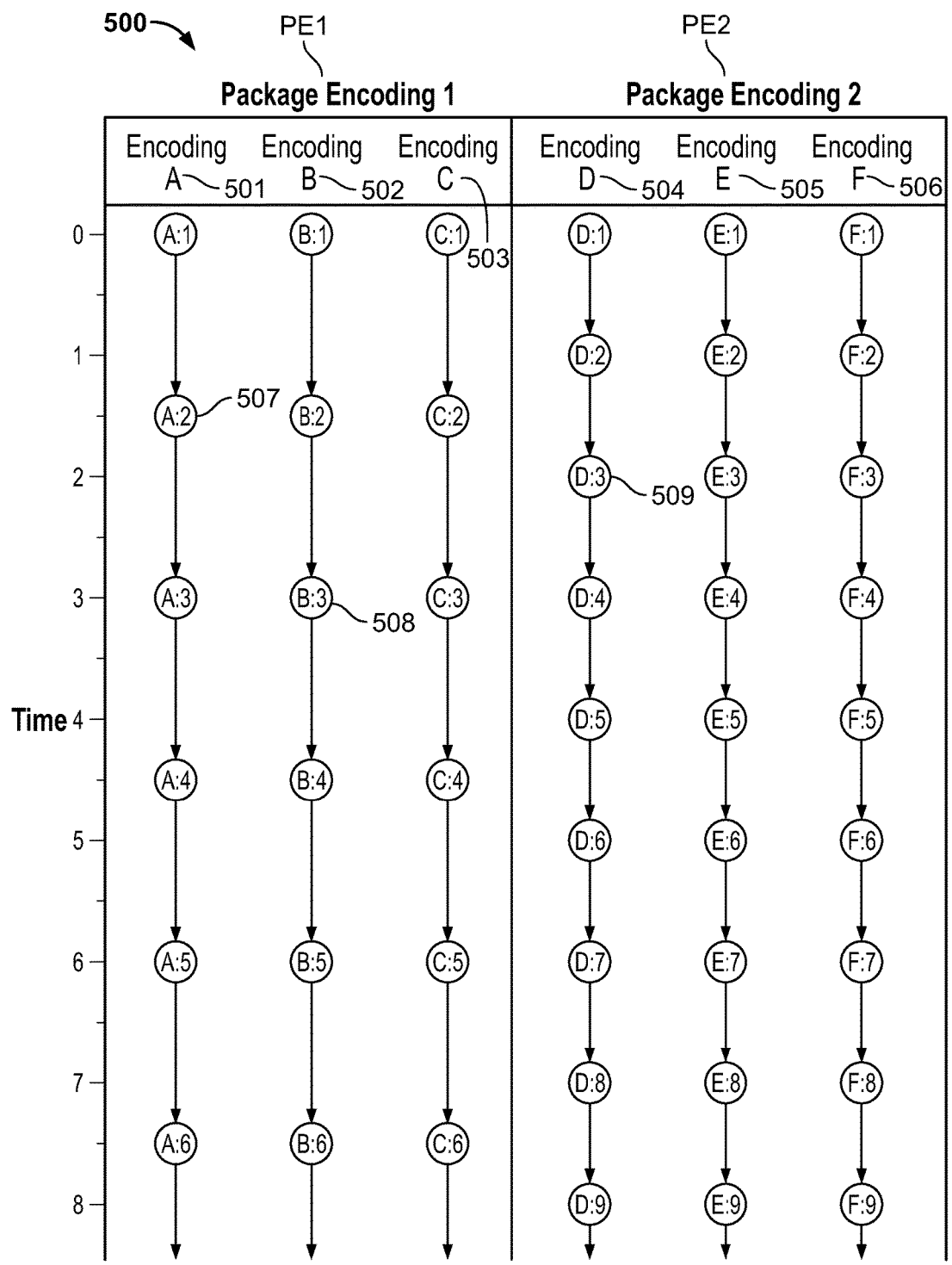
FIGS. 5A, 5B, and 5C are illustrations of mapping encodings corresponding to two different package encodings according to embodiments of the present disclosure.
Figures 5B, 5C:
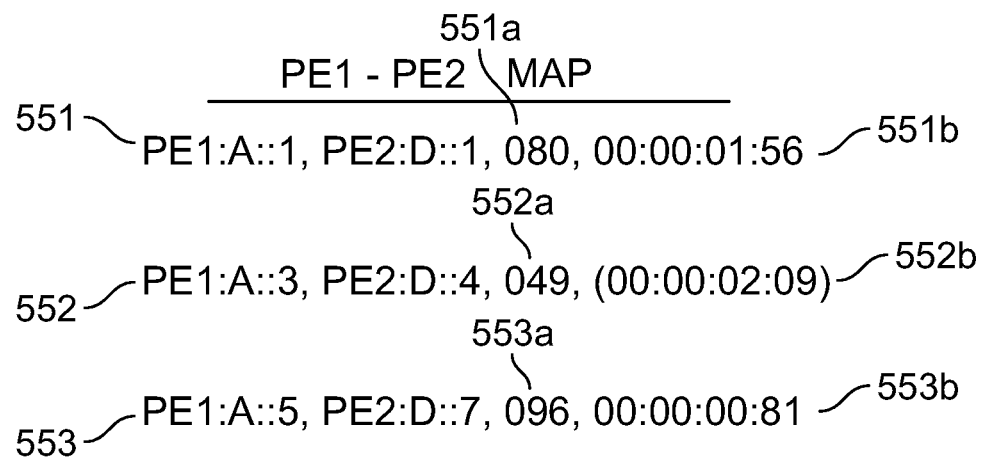

Referring now to FIGS. 5A, 5B, and 5C a graphical example 500 of identifying aligned I-frames is shown with respect to the same video content from two different package encodings PE1, PE2. The graph depicts shards of encodings across a time dimension of the same video content. The package encodings PE1, PE2, may include three encodings in this example, encodings 501-503 (or A-C) of PE1 and encodings 504-506 (or D-F) of PE2. It will be understood that the numbers of encodings and package encodings are shown merely by way of example, and variations of all aspects are considered by this disclosure.

Referring to FIG. 5A, each node of the depicted graph represents a shard which makes up a portion of the video content. In FIG. 5A, the nodes are labeled with simplified address labels, corresponding to the encoding identifier (A-F) and the node or shard number (for example A:1-A:6 and F1-F9). This is similar to iterative naming schematics utilized by encoders of the related art, whereby the shard addresses follow a network based addressing scheme, such as internet protocol IPv6. IPv6 may be particularly well suited for this purpose due to the large number of addresses available in a 128 bit address naming scheme.

Accordingly, a shard address consists of: a prefix that is uniquely assigned to the package encoding of the video, an encoding ID that identifies a particular encoding of the package encoding, and the ID of the individual shard that is part of the particular encoding of the encoding ID. Thus, to identify a particular node or shard within the package encodings shown in FIG. 5A, the package encoding ID prefix is followed by the encoding prefix, which is followed by a shard identifier. Using IPv6 protocol, a shard of a package encoding can be addressed as follows:

| Prefix | Encoding ID | Shard ID |
|---|---|---|
| n bits | m bits | 128-n-m bits |

Referring to the example of FIG. 5A, "EN1:A::2" addresses the second shard 507 of the first encoding of package encoding 1 PE1, where use of the double colon "::" refers to the IPv6 address notation symbolizing omission of a contiguous group of leading zeros in a 128 bit address. For example 2001:0DB8:0000:0000:0000:0000:0000:0001can be written as "2001:DB 8::1".

Further while the graph has been simplified as a directed graph to only show arrows indicating processing successive nodes of the same encoding, it will be understood that the related art includes client terminals which can switch between encodings of the same package encoding, thereby switching between encodings (between encodings A, B, C and between encodings D, E, F. For example, while arrows are not shown between nodes A:2 (507) of encoding A and B:3 (508) of encoding B for simplicity, it will be understood that a client terminal of the related art is able to switch between encoding A and encoding B at I-frame 508. However, as discussed, client terminals of the related art are not able to switch between encodings of different package encodings PE1, PE2. For example, a client terminal of the related art is unable to switch from encoding B of PE1 to encoding D of PE2 at shard 509 since the I-frame of shard 509 is not aligned with an I-frame of encoding B.

As previously discussed, the fingerprint generator may generate invariant fingerprint data of each of the I-frames of the encodings 501-506. The frame analyzer may then compare the fingerprint data for each of the I-frames of PE1 with the fingerprint data for each of the I-frames of PE2 to determine whether any of the I-frames are aligned between package encodings PE1, PE2. In some embodiments, since encodings of a single package encoding will typically have aligned I-frames to permit switching between encodings, the fingerprint generator and frame analyzer may only need to generate and compare fingerprint data for only one encoding of each package encoding to perform comparison and mapping generation.

Referring back to FIG. 5A, the frame analyzer may determine, based on the fingerprint data, that I-frames at the first position (time=0) are aligned, in most cases since this may correspond to the very beginning of the video content. Proceeding with the example of FIG. 5A, the frame analyzer will compare the fingerprint data for the second I-frames, for example PE1:A::2 and PE2:D::2. As these correspond to different temporal points within the video content, the fingerprint data will not be identical or sufficiently similar and the frame analyzer will determine that these I-frames are not aligned.

In other embodiments, the frame analyzer will compare fingerprint data of a single I-frame of one encoding, for example PE1:A::3 with fingerprint data of the I-frames of an encoding of PE2, iterating through each I-frame fingerprint data of PE2 to compare with the fingerprint data of PE1: A::3. The frame analyzer may thus continue to perform analysis and comparison of fingerprint data, and when comparing fingerprint data for PE1:A::3 and PE2:D::4, these frames correspond to the same temporal point 3 of the video content, and thus the fingerprint data of each I-frame may be identical or sufficiently correspond. The frame analyzer determines that an alignment is present and may output identifying information of the aligned frames to the mapper. Continuing with the example of FIG. 5A, the frame analyzer may determine that an alignment of the package encodings PE1, PE2 is also present at PE1:A::5 and PE2:D::7.

Based on the example in FIG. 5A, FIG. 5B shows a simplified example of a generated affiliated content map generated by the mapper of an embodiment of the affiliated content mapping generator. Based on the alignments detected by the frame analyzer as discussed in FIG. 5A, the mapper may generate a content map 550 indicating corresponding I-frames of package encodings PE1, PE2, including corresponding pairs PE1:A::1, PE2:D::1; PE1:A::3, PE2:D::4 and PE1:A::5, PE2:D::7. As previously discussed, the mapper may generate the content map to include information of aligned I-frames for one encoding from each of the package encodings since the encodings of a single package encoding will generally be aligned with all other encodings of the same package encoding. In such cases, the content map may be generated to only identify the shard addresses, for example 1:1; 3:4; and 5:7 in FIG. 5B, since the package encoding prefix ID of PE1, PE2 will be known, and the shards of all encodings within each package encoding are aligned. In other embodiments, the content map may include information of all aligned I-frames of all encodings of each package encoding to provide all address and naming convention information from different package encodings.

The example discussed above considers determining aligned I-frames of only two different package encodings PE1, PE2, however it will be understood that the affiliated content mapping generator is configured to receive, identify, retrieve, and/or process encodings from multiple different package encodings corresponding to the same video content, and to generate affiliated content mapping information corresponding to each different package encoding. In these cases, the affiliated content mapping generator may further be configured to determine and assign a ranking for each package encoding with respect to the selected video content. The frame analyzer may compare generated fingerprint data for the frames of the different package encodings and determine a similarity confidence level between the frames.

Further, similarity confidence levels are determined and assigned by the frame analyzer where the fingerprint data of frames may be very similar to each other, but are not identical. This may be the case when comparing package encodings of the same video content which are compressed using different compression techniques, different bit rates, encoded at different framerates, and the like, resulting in frames within a grouping of frames which are very similar but not identical.

For example, during a high movement scene, one encoding at 24 frames per second may not include a frame which is identical to an I-frame of an encoding which is encoded at 30 frames per second. The 24 fps encoding process is inherently required to leave out certain frames which are included in the 30 fps version. Additionally, the frames of the 24 fps encoding may include more motion blur than the frames of the 30 fps encoding, thereby introducing some differences in the resulting fingerprint data. However, the 24 fps encoding will still include a grouping of frames which are very similar to the I-frame of the 30 fps encoding.

Thus in an embodiment where the 30 fps encoding has been selected for playback from a first package encoding and the 24 fps encoding is received from a second package encoding, the fingerprint generator may be configured to process and generate fingerprint data for all frames of the 24 fps and 30 fps encodings, and the frame analyzer may be configured to identify a grouping of candidate frames in the 24 fps encoding which have a high match probability with the I-frame of the 30 fps encoding.

When a closest match frame of the candidate frames is identified from the 24 fps encoding, a match confidence level with the particular I-frame of the 30 fps encoding may be assigned. Further, after determining and assigning match confidence levels for all frame alignments of the encodings, the frame analyzer may further be configured to determine a total match confidence level, or a ranking value, for the first and second package encodings with respect to the video content selected for playback at the client terminal.

FIG. 5C shows an example of an affiliated content map 550 which includes information of a match confidence level assigned to a particular correspondence between package encodings. Continuing from the example of FIG. 5B, if the matches between the I-frames of PE1, PE2 are not found to be identical, but are determined to have a high level of similarity, the video fingerprint analyzer may be configured to identify a match based on a sufficient level of correspondence compared to a threshold comparison value, and further assign a match confidence level 552a, 552b, 552c based on the level of correspondence. For example, for match 551, the fingerprint analyzer may determine that the level of correspondence is fairly high and assign a match confidence level of 080 (551a) out of 100. For match 552, the fingerprint analyzer may determine that the level of correspondence is average and assign a match confidence level of 049 (552a). For match 552, the fingerprint analyzer may determine that the level of correspondence is very high with very slight differences, and assign a high match confidence level of 096 (553a). These values are used only by way of example, and various implementations and embodiments of match confidence level values and rankings are considered by this disclosure.

Thus, match confidence levels 551a, 552a, 553a may be determined and assigned for each pair value in the affiliated content map. These match confidence levels may be compared with match confidence levels of other affiliated content maps to determine the highest rank for each I-Frame switch opportunity, or they may be used with other match confidence levels for the same encoding or package encoding for calculating an overall match confidence level for the encoding or the package encoding.

Additionally, where a grouping of candidate frames of a secondary package encoding is identified as having a high similarity level with a particular I-frame of a primary package encoding, the fingerprint analyzer may identify a particular frame within the candidate frames having a highest level of similarity. In these embodiments, the identified particular frame having the highest level of similarity may not be an I-frame of the secondary package encoding. Thus, in some embodiments the fingerprint analyzer may be configured to determine an offset value representing a time value difference for switching from the I-frame of the primary package encoding to the non-I-frame of the secondary package encoding.

Figure 6:
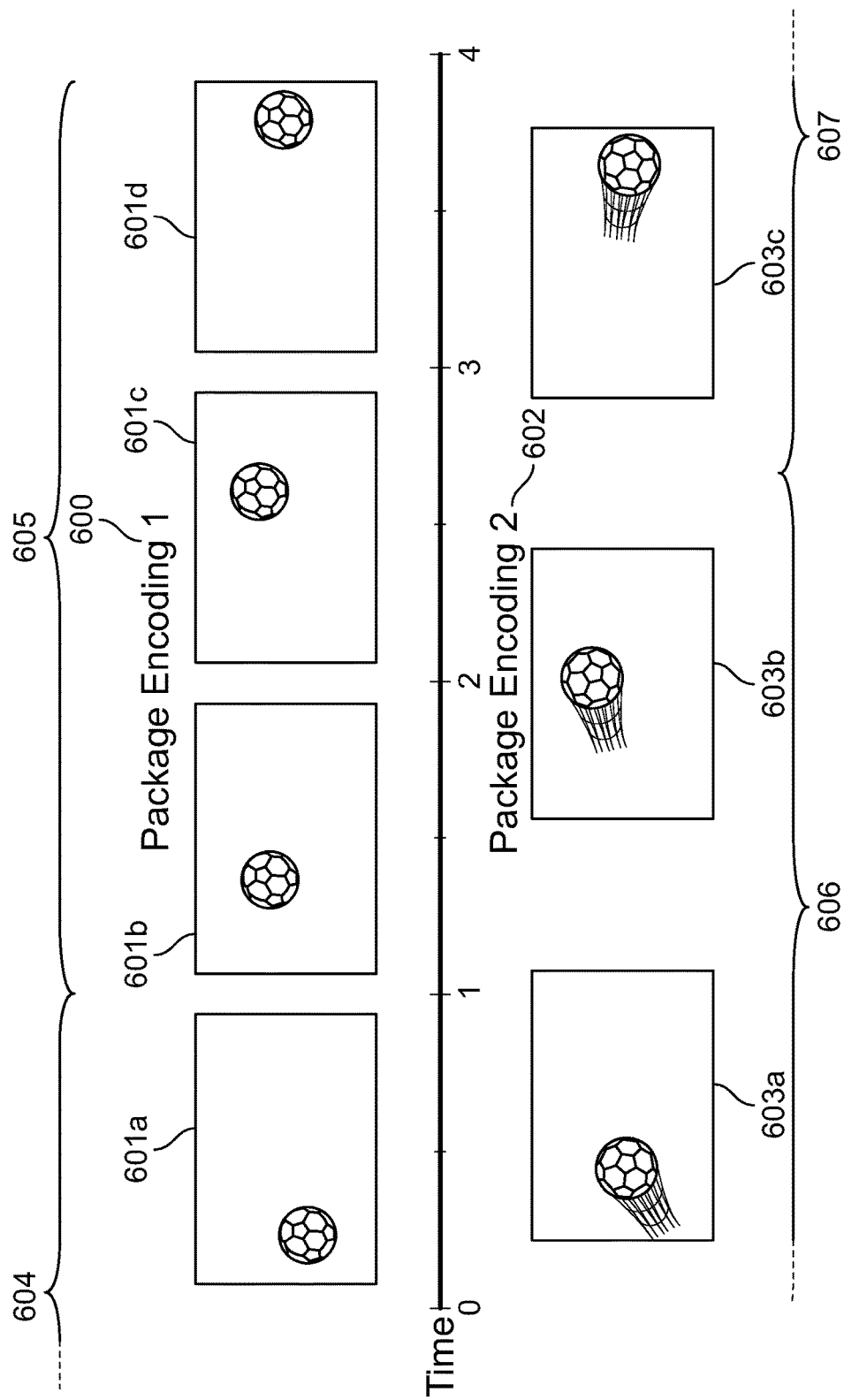
FIG. 6 is an illustration of frames of different package encodings for processing by an embodiment of the present disclosure.

For example, referring to FIG. 6, individual frames of two encodings from different package encodings, package encoding 1 (600) and package encoding 2 (602) are shown. Package encoding 1 may correspond to content encoded at a higher frame rate than the encoding of package encoding 2. For example, package encoding 1 600 may be encoded at 30 frames per second and package encoding 2 602 may be encoded at 24 frames per second. Accordingly, the encoding of package encoding 1 600 may include more frames across a particular time period than the encoding of package encoding 2 602, as shown in FIG. 6.

As discussed, a higher frame rate encoding may also result in clearer image quality particularly during scenes with high levels of movement as compared to lower frame rate encodings. Thus, as shown in FIG. 6, a higher frame rate may result in a moving object such as the depicted soccer ball having no associated motion blur since a higher number of frames 601a, 601b, 601c, 601d during the movement is included in the encoding. Conversely, a lower frame rate encoding will include less frames over the same time period with more motion blur since a lower number of frames 603a, 603b, 603c during the movement is included in the encoding.

In this example, frame 601b of package encoding 1 may be an I-frame corresponding to frameset 605 which follows frameset 604, and frame 603c may be an I-frame corresponding to frameset 607 of package encoding 2 which follows frameset 606. However, the fingerprint data of I-frame 601b and I-frame 603c will likely not result in a match since the I-frames are similar but aren't exactly aligned, the lower frame rate encoding from package encoding 2 results in a different position of the soccer ball, and the lower frame rate encoding introduces more motion blur, which may all affect an extracted signature of generated fingerprint data for frame 603c. However in other embodiments as discussed above, the fingerprint generator may be configured to generate fingerprints for all frames of the encodings, including 603a, 603b, 603c (among all other surrounding frames of package encoding 2) and use the fingerprint data for comparison with the I-frames of package encoding 1. The fingerprint analyzer may then identify 603a, 603b, 603c as a grouping of candidate frames which sufficiently correspond to I-frame 601b.

As discussed above, among the candidate frames the fingerprint analyzer may then identify a match between I-frame 601b and frames 603a and 603b based on a sufficient level of correspondence compared to a threshold comparison value. The fingerprint analyzer may further assign a match confidence level for each potential match based on the level of correspondence.

Further as discussed, the fingerprint analyzer may also determine an offset between matched frames to provide information of a time difference between a non-I-frame 603*b* and a corresponding I-frame 601*b*, to allow for seamless switching by a client terminal. This offset value may be defined with respect to a closest I-frame of the secondary package encoding, which either falls before or after the identified non-I-frame. For example, for the match between 601*b* and 603*b*, the fingerprint analyzer may determine that the matched frame 603*b* falls 00:00:01:00 seconds (or other time unit) behind the next I-frame 603*c* of package encoding 2. This may be represented in the affiliated content map in some embodiments as a negative value, such as −00:00:01:00 or (00:00:01:00). Accordingly, the affiliated content map information may indicate a match between I-frames 601*b* and 603*c*, but further provide an offset of −00:00:01:00 to indicate that the best matched frame corresponds to 603*b* (instead of 603*c*). Using this information, a client terminal may request, receive, and/or buffer in advance framesets 606 and 607 in anticipation of switching from I-frame 601*b* of package encoding 1 to non-I-frame 603*b* of package encoding 2, using the identified I-frame 603*c* and offset of −00:00:01:00.

Thus, the offset value may be determined with respect to a closest I-frame of the secondary package encoding, or in other embodiments the offset value may also be determined with respect to a timestamp of the I-frame 601*b* of package encoding 1. Therefore, referring back to FIG. 5C, offset values 551*b*, 552*b*, 552*c* may be provided for each match provided in an affiliated content map. The client terminal may be able to switch to an encoding of another package encoding by advance buffering framesets and using the offset value at a next I-frame jump point to load decoded video content data starting at a time point corresponding to the offset value. Thus, in such embodiments, the client terminal may be able to switch to another package encoding even where the I-frames are not closely matched.

The affiliated content map output by the mapper may include ranking information and/or offset value information of all available package encodings, or of all available individual encodings of the various package encodings. At playback, the client terminal may select a highest ranked individual encoding, or encoding with lowest total offset value, according to the affiliated content map information. Alternatively, during playback the client terminal may also select each next shard based on which I-frame alignment is ranked highest among all the different available individual encodings or which has a lowest number offset value, thereby presenting the smoothest transition from one package encoding to another at the next I-frame switch point.

In some embodiments, the client terminal may receive the affiliated content map at the time the video content to be played back is selected. The metadata of the selected content may be provided to the affiliated content mapping generator, which returns the generated affiliated content map indicating alignment information of available encodings from other package encodings. The client terminal may then utilize the generated content map in real time during playback of the selected video content, for example in response to a change in connection bandwidth, as previously discussed. In other embodiments, the client terminal may preprocess the generated map information prior to beginning playback. In these cases, the client terminal may generate a playback plan based on the generated content map, including predetermined switches between available package encodings to provide the best viewing experience of the selected video content.

In determining the playback plan, the client terminal may base the switching points based on environmental factors such as current bandwidth or current connection quality, as well as predicted bandwidth and predicted connection quality. In other cases, the client terminal may determine the playback plan based on factors related to the content itself using metadata or encoded file information. For example, during scenes involving a lot of action or high motion (corresponding to large encoded file sizes), the playback plan may include switching to a lower level encoding available from another package encoding. Alternatively, the client terminal may also choose to switch to a higher level encoding at the high action/motion scene to ensure smooth framerate and motion viewing for the user during the motion and data intensive portion of the video content. In other embodiments, the playback plan may be generated by the affiliated content mapping generator or by a content server, and provided to the client terminal for playback according to the playback plan.

In some embodiments, the affiliated content mapping generator may be connected to the network to provide the generated mapping information to the client terminal. In these cases, the mapping information may be provided to the client terminal as a data header of encoded files transmitted to the client terminal, as a separate data transmission associated with encoded files provided to the client terminal by a content server, or as a portion of an encoding manifest provided to the client defining encoding formats of the encoded files of the selected video content. In yet other embodiments, the mapping information may be generated by the affiliated content mapping generator and stored in a memory and the client terminal may be provided with address information for retrieval of the affiliated content map associated with the video content selected for playback at the client terminal.

Figure 7:
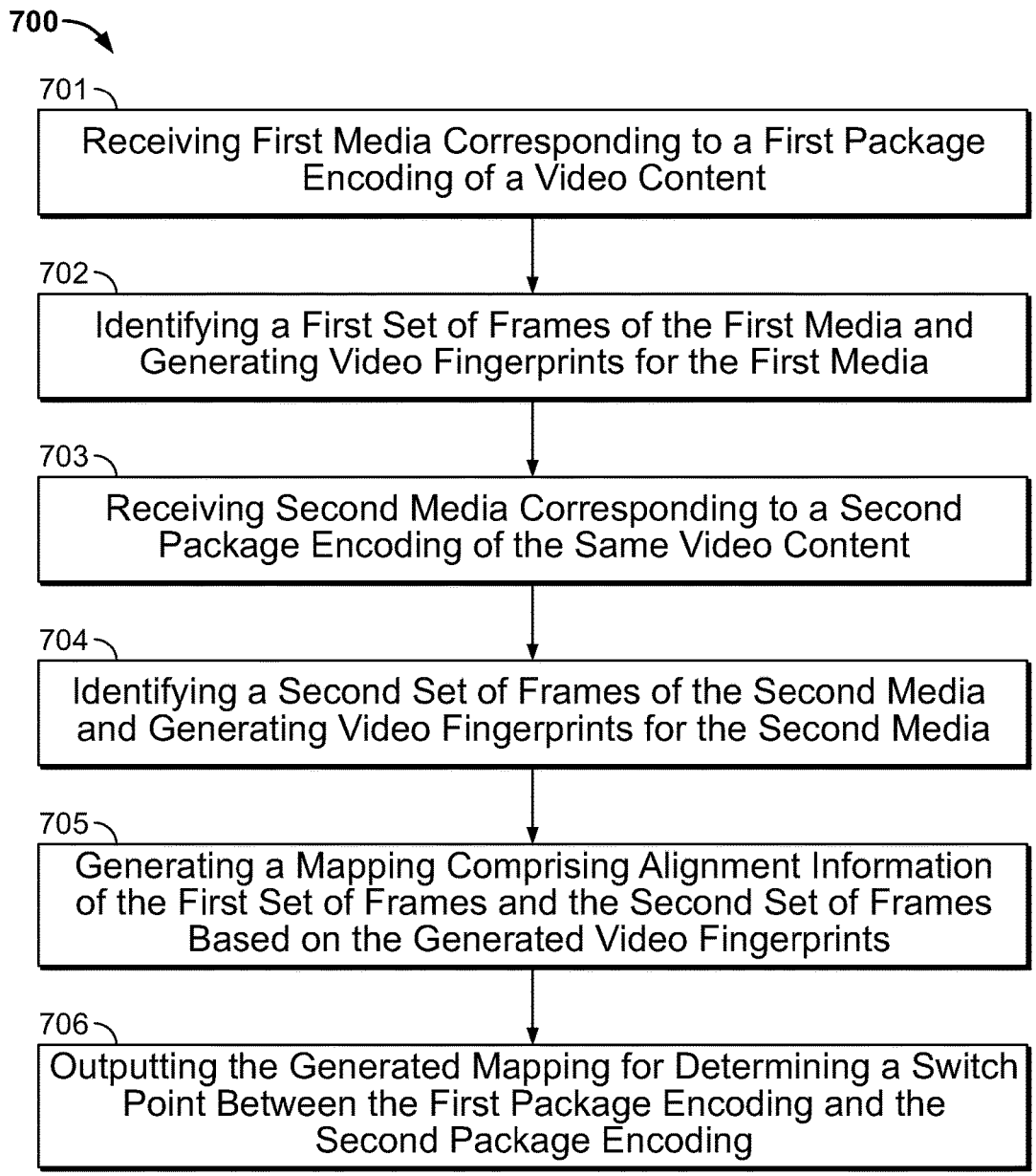
FIG. 7 is an illustration of a method of mapping affiliated content graphs using video fingerprints in accordance with an embodiment of the present disclosure.

Referring now to FIG. 7, a method 700 of mapping affiliated content graphs using video fingerprints according to one embodiment of the present disclosure will be discussed. The method 700 may include receiving first media corresponding to a first package encoding of a video content to be output at block 701, and identifying a first set of frames of the first media and generating video fingerprints for the first media based on the first set of frames at block 702.

The method further includes receiving second media corresponding to a second package encoding of the same video content to be output at block 703, identifying a second set of frames of the second media and generating video fingerprints for the second media based on the second set of frames and block 704, and further generating a mapping comprising alignment information of one or more frames of the first set of frames and one or more frames of the second set of frames based on the generated video fingerprints for the first media and the generated video fingerprints for the second media at 705. Finally, the method may include outputting the generated mapping for determining a switch point for outputting the video content using the first package encoding and switching to outputting the video content using the second package encoding during output of the video content, wherein the switch point is defined by the alignment information as shown at block 706.

As previously discussed, in some embodiments the affiliated content mapping generator, the client terminal, the encoder, the content servers, the web servers, or other aspects of the disclosed system may comprise one or more software or hardware computer systems and may further comprise or be operably coupled to one or more hardware memory systems for storing information including databases for storing, accessing, and querying various content, encoded data, shard addresses, metadata, and the like. In hardware implementations, the one or more computer systems incorporate one or more computer processors and controllers.

The components of the various embodiments discussed herein may each comprise a hardware processor of the one or more computer systems, and in one embodiment a single processor may be configured to implement the various components. For example, in one embodiment, the affiliated content mapping generator, the encoders, the content servers, and the web servers, or sub combinations thereof, may be implemented as separate hardware systems, or may be implemented as a single hardware system. The hardware system may include various transitory and non-transitory memory for storing information, wired and wireless communication receivers and transmitters, displays, and input and output interfaces and devices. The various computer systems, memory, and components of the system 300 may be operably coupled to communicate information, and the system may further include various hardware and software communication modules, interfaces, and circuitry to enable wired or wireless communication of information.

Figure 8:
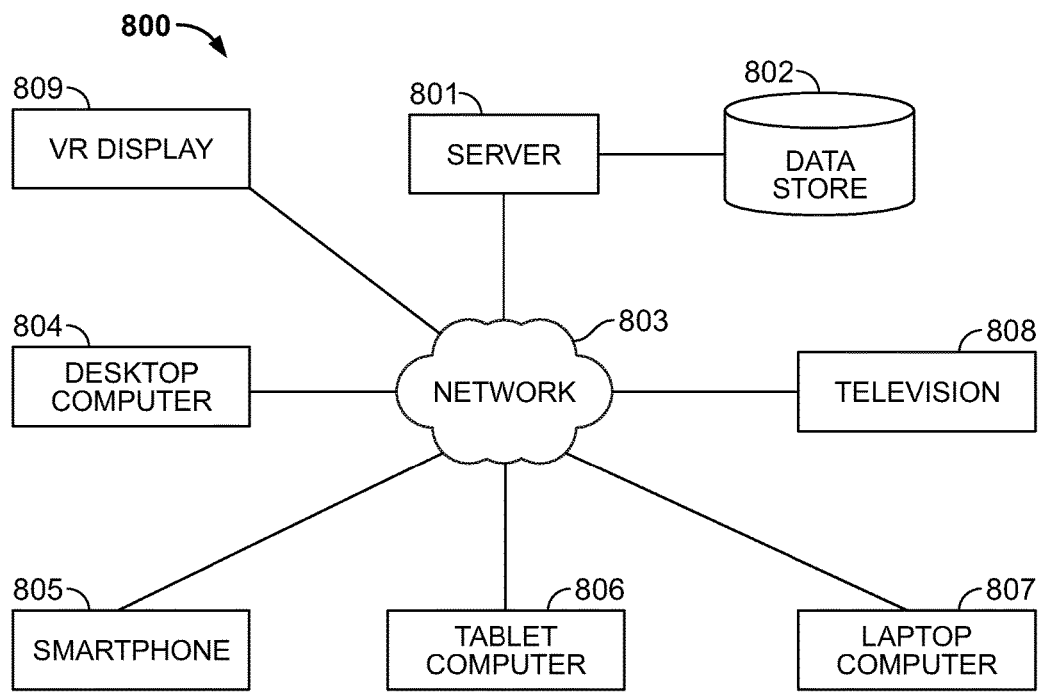
FIG. 8 is an illustration of a computing environment in accordance with an embodiment of the present disclosure.

In selected embodiments, the features and aspects disclosed herein may be implemented within a computing environment 800 shown in FIG. 8, which may include one or more computer servers 801. A server 801 may be operatively coupled to one or more data stores 802 (e.g., databases, indexes, files, or other data structures). A server 801 may connect to a data communication network 803 comprising a local area network (LAN), a wide area network (WAN) (e.g., the Internet), a telephone network, a satellite or wireless communication network, or some combination of these or similar networks.

One or more client devices 804, 805, 806, 807, 808, 809 may be in communication with the server 801, and a corresponding data store 802 via the data communication network 803. Such client devices 804, 805, 806, 807, 808, 809 may include, for example, one or more laptop computers 807, desktop computers 804, smartphones and mobile phones 805, tablet computers 806, televisions 808, virtual reality displays 809, or combinations thereof. In operation, such client devices 804, 805, 806, 807, 808 may send and receive data or instructions from or to the server 801, in response to user input received from user input devices or other input. In response, the server 801 may serve data from the data store 802, alter data within the data store 802, add data to the data store 802, or the like or combinations thereof.

In selected embodiments, the server 801 may stream or transmit one or more video files including video content, audio content, encoded data, generated data, and/or metadata from the data store 802 to one or more of the client devices 804, 805, 806, 807, 808, 809 via the data communication network 803. The devices may output video content from the video file using a display screen, projector, or other video output device. For example, the video file may comprise a clip of a movie, television show, live programming, news broadcast, or portion thereof for output using a display device of one or more of the client devices. In certain embodiments, the system 800 configured in accordance with the features and aspects disclosed herein may be configured to operate within or support a cloud computing environment. For example, a portion of, or all of, the data store 802 and server 801 may reside in a cloud server.

Figure 9:
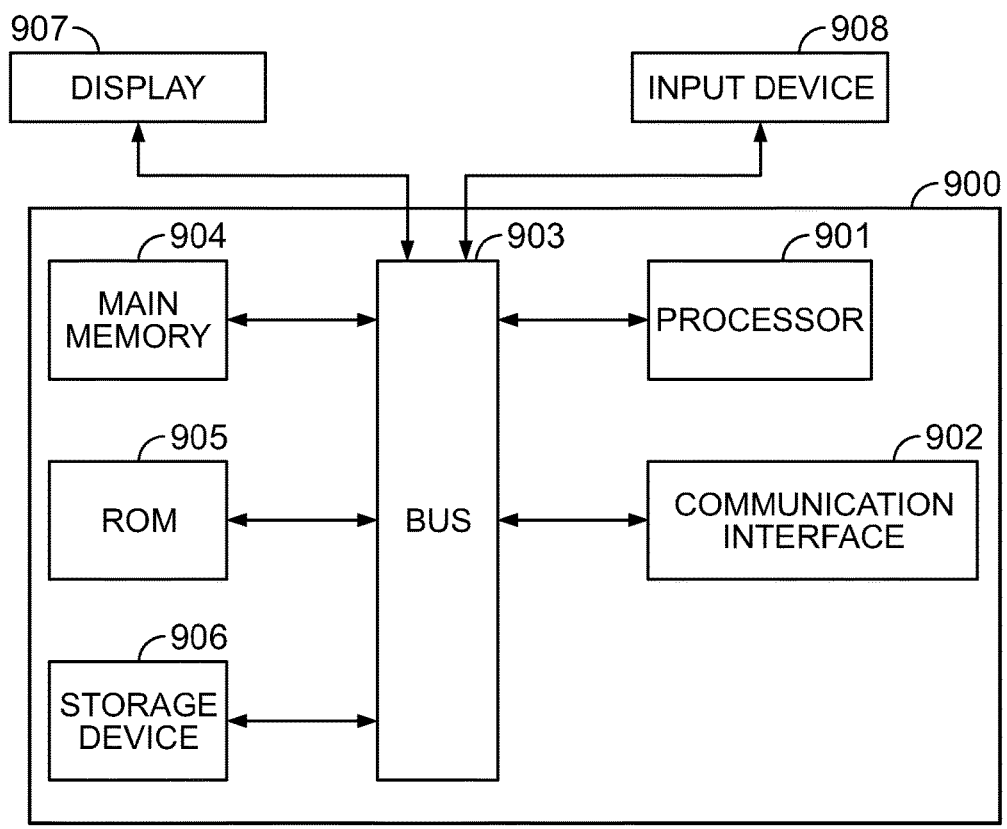
FIG. 9 is an illustration of a device in accordance with an embodiment of the present disclosure.

Referring to FIG. 9, an illustration of an example computer 900 is provided. One or more of the devices 804, 805, 806, 807, 808, 809 of the system 800 may be configured as or include such a computer 900. In selected embodiments, the computer 900 may include a bus 903 (or multiple buses) or other communication mechanism, a processor 901, main memory 904, read only memory (ROM) 905, one or more additional storage devices 906, a communication interface 902, or the like or sub-combinations thereof. The embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In all embodiments, the various components described herein may be implemented as a single component, or alternatively may be implemented in various separate components.

A bus 903 or other communication mechanism, including multiple such buses or mechanisms, may support communication of information within the computer 900. A processor 901 may be connected to a bus 903 and process information. In selected embodiments, a processor 901 may be a specialized or dedicated microprocessor configured to perform particular tasks in accordance with the features and aspects disclosed herein by executing machine-readable software code defining the particular tasks. Main memory 904 (e.g., random access memory—or RAM—or other dynamic storage device) may be connected to a bus 903 and store information and instructions to be executed by a processor 901. Main memory 904 may also store temporary variables or other intermediate information during execution of such instructions.

Read only memory 905 (ROM) or some other static storage device may be connected to a bus 903 and store static information and instructions for a processor 901. An additional storage device 906 (e.g., a magnetic disk, optical disk, memory card, or the like) may be connected to a bus 903. The main memory 904, ROM 905, and the additional storage device 906 may include a non-transitory computer-readable medium holding information, instructions, or some combination thereof, for example instructions that when executed by the processor 901, cause the computer 900 to perform one or more operations of a method as described herein. A communication interface 902 may also be connected to a bus 903. A communication interface 902 may provide or support two-way data communication between a computer 900 and one or more external devices (e.g., other devices contained within the computing environment).

In selected embodiments, a computer 900 may be connected (e.g., via a bus) to a display 907. A display 907 may use any suitable mechanism to communicate information to a user of a computer 900. For example, a display 907 may include or utilize a liquid crystal display (LCD), light emitting diode (LED) display, projector, or other display device to present information to a user of the computer 900 in a visual display. One or more input devices 908 (e.g., an alphanumeric keyboard, mouse, microphone) may be connected to a bus 903 to communicate information and commands to a computer 900. In selected embodiments, one input device 908 may provide or support control over the positioning of a cursor to allow for selection and execution of various objects, files, programs, and the like provided by the computer 900 and displayed by a display 907.

The computer 900 may be used to transmit, receive, decode, display, or the like one or more video files. In selected embodiments, such transmitting, receiving, decoding, and displaying may be in response to a processor 901 executing one or more sequences of one or more instructions contained in main memory 904. Such instructions may be read into main memory 904 from another non-transitory computer-readable medium (e.g., a storage device).

Execution of sequences of instructions contained in main memory 904 may cause a processor 901 to perform one or more of the procedures or steps described herein. In selected embodiments, one or more processors in a multi-processing arrangement may also be employed to execute sequences of instructions contained in main memory 904. Alternatively, or in addition thereto, firmware may be used in place of, or in connection with, software instructions to implement procedures or steps in accordance with the features and aspects disclosed herein. Thus, embodiments in accordance with the features and aspects disclosed herein may not be limited to any specific combination of hardware circuitry and software.

Non-transitory computer readable medium may refer to any medium that participates in holding instructions for execution by a processor 901, or that stores data for processing by a computer, and comprise all computer-readable media, with the sole exception being a transitory, propagating signal. Such a non-transitory computer readable medium may include, but is not limited to, non-volatile media, volatile media, and temporary storage media (e.g., cache memory). Non-volatile media may include optical or magnetic disks, such as an additional storage device. Volatile media may include dynamic memory, such as main memory. Common forms of non-transitory computer-readable media may include, for example, a hard disk, a floppy disk, magnetic tape, or any other magnetic medium, a CD-ROM, DVD, Blu-ray or other optical medium, RAM, PROM, EPROM, FLASH-EPROM, any other memory card, chip, or cartridge, or any other memory medium from which a computer can read.

In selected embodiments, a communication interface 902 may provide or support external, two-way data communication to or via a network link. For example, a communication interface 902 may be a wireless network interface controller or a cellular radio providing a data communication network connection. Alternatively, a communication interface 902 may comprise a local area network (LAN) card providing a data communication connection to a compatible LAN. In any such embodiment, a communication interface 902 may send and receive electrical, electromagnetic, or optical signals conveying information.

A network link may provide data communication through one or more networks to other data devices (e.g., client devices as shown in the computing environment 800). For example, a network link may provide a connection through a local network of a host computer or to data equipment operated by an Internet Service Provider (ISP). An ISP may, in turn, provide data communication services through the Internet. Accordingly, a computer 900 may send and receive commands, data, or combinations thereof, including program code, through one or more networks, a network link, and communication interface 902. Thus, a computer 900 may interface or otherwise communicate with a remote server (e.g., server 801), or some combination thereof.

The various devices, modules, terminals, and the like discussed herein may be implemented on a computer by execution of software comprising machine instructions read from computer-readable medium, as discussed above. In certain embodiments, several hardware aspects may be implemented using a single computer, in other embodiments multiple computers, input/output systems and hardware may be used to implement the system.

For a software implementation, certain embodiments described herein may be implemented with separate software modules, such as procedures and functions, each of which perform one or more of the functions and operations described herein. The software codes can be implemented with a software application written in any suitable programming language and may be stored in memory and executed by a controller or processor.

The foregoing disclosed embodiments and features are merely exemplary and are not to be construed as limiting the present invention. The present teachings can be readily applied to other types of apparatuses and processes. The description of such embodiments is intended to be illustrative, and not to limit the scope of the claims. Many alternatives, modifications, and variations will be apparent to those skilled in the art.

What is claimed is:

1. A method comprising:
receiving first media corresponding to a first package encoding of a video content;
identifying a first set of frames of the first media and generating video fingerprints for the first media based on the first set of frames;
receiving second media corresponding to a second package encoding of the same video content;
identifying a second set of frames of the second media and generating video fingerprints for the second media based on the second set of frames;
generating a mapping for the entire video content comprising alignment information of a first plurality of frames of the first set of frames and a second plurality of frames of the second set of frames based on the generated video fingerprints for the first media and the generated video fingerprints for the second media; and
prior to playback of the video content, outputting the generated mapping for the entire video content, the generated mapping identifying switch points for switching from the first package encoding to the second package encoding during display of the video content,
wherein the switch points are defined by the alignment information,
wherein the alignment information of the generated mapping comprises an offset value for each alignment between the first plurality of frames of the first set of frames and the corresponding second plurality of frames of the second set of frames, and
wherein the offset value indicates a time difference by which each of the first plurality of frames of the first set of frames is shifted from a corresponding frame of the second plurality of frames of the second set of frames.

2. The method of claim 1, wherein the first set of frames correspond to I-frames of the first package encoding and the second set of frames correspond to I-frames of the second package encoding.

3. The method of claim 1, wherein a first frame of the first set of frames and a second frame of the second set of frames are determined to be aligned when a generated video fingerprint of the first frame and a generated video fingerprint of second frame meet a threshold level of similarity.

4. The method of claim 3, wherein:
the first set of frames correspond to I-frames of the first package encoding and the second set of frames correspond to I-frames of the second package encoding; and
the alignment information of the generated mapping comprises shard addresses corresponding to the I-frames of the first package encoding and the I-frames of the second package encoding.

5. The method of claim 1, further comprising assigning a match confidence level value to each alignment of the alignment information of the first plurality of frames of the first set of frames and the second plurality of frames of the second set of frames.

6. The method of claim 5, further comprising assigning a ranking value to the second package encoding based on a total confidence level using the assigned match confidence level values.

7. The method of claim 6, wherein the ranking value is based on a ratio of a number of alignments between the first plurality of frames of the first set of frames and the second plurality of frames of the second set of frames with respect to a total number of the second set of frames.

8. The method of claim 6, wherein:
the first media and second media are received from different content sources;
the second package encoding is one of a plurality of ranked package encodings, wherein one or more of the plurality of ranked package encodings are received from different content sources; and
the method further comprises selecting the second package encoding as a highest ranked package encoding for switching an encoding level of the video content during display of the video content.

9. The method of claim 1, wherein:
the first media and second media are received from different content sources;
receiving the second media corresponding to the second package encoding comprises:
obtaining metadata related to the video content;
transmitting a query to one or more external sources for media related to the obtained metadata, the one or more external sources comprising a second content source; and
receiving the second media from the second content source in response to the transmitted query.

10. The method of claim 1, further comprising:
generating a playback plan prior to display of the video content and based on the generated mapping, wherein the playback plan comprises at least one switch from one package encoding to another package encoding; and
outputting the playback plan for display of the video content according to the playback plan.

11. A system for providing video content, the system comprising:
a communication unit configured to receive and transmit information; and
one or more processors configured to:
receive, via the communication unit, first media corresponding to a first package encoding of a video content;
identify a first set of frames of the first media and generating video fingerprints for the first media based on the first set of frames;
receive, via the communication unit, second media corresponding to a second package encoding of the same video content;
identify a second set of frames of the second media and generating video fingerprints for the second media based on the second set of frames;
generate a mapping for the entire video content comprising alignment information of a first plurality of frames of the first set of frames and a second plurality of frames of the second set of frames based on the generated video fingerprints for the first media and the generated video fingerprints for the second media; and prior to playback of the video content, output the generated mapping for the entire video content, the generated mapping identifying switch points for switching from the first package encoding to the second package encoding during display of the video content,
wherein the switch points are defined by the alignment information,
wherein the alignment information of the generated mapping comprises an offset value for each alignment between the first plurality of frames of the first set of frames and the corresponding second plurality of frames of the second set of frames, and
wherein the offset value indicates a time difference by which each of the first plurality of frames of the first set of frames is shifted from a corresponding frame of the second plurality of frames of the second set of frames.

12. The system of claim 11, wherein the first set of frames correspond to I-frames of the first package encoding and the second set of frames correspond to I-frames of the second package encoding.

13. The system of claim 11, wherein the one or more processors are further configured to determine alignment between a first frame of the first set of frames and a second frame of the second set of frames when a generated video fingerprint of the first frame and a generated video fingerprint of second frame meet a threshold level of similarity.

14. The system of claim 13, wherein:
the first set of frames correspond to I-frames of the first package encoding and the second set of frames correspond to I-frames of the second package encoding; and
the alignment information of the generated mapping comprises shard addresses corresponding to the I-frames of the first package encoding and the I-frames of the second package encoding.

15. The system of claim 11, wherein the one or more processors are further configured to assign a match confidence level value to each alignment of the alignment information of the first plurality of frames of the first set of frames and the second plurality of frames of the second set of frames.

16. The system of claim 15, wherein the one or more processors are further configured to assign a ranking value to the second package encoding based on a total confidence level using the assigned match confidence level values.

17. The system of claim 16, wherein the ranking value is based on a ratio of a number of alignments between the first plurality of frames of the first set of frames and the second plurality of frames of the second set of frames with respect to a total number of the second set of frames.

18. The system of claim 16, wherein:
the first media and second media are received from different content sources;
the second package encoding is one of a plurality of ranked package encodings, wherein one or more of the plurality of ranked package encodings are received from different content sources; and
the one or more processors are further configured to select the second package encoding as a highest ranked package encoding for switching an encoding level of the video content during display of the video content.

19. The system of claim 11, wherein:
the first media and second media are received from different content sources; and
the one or more processors are further configured to receive the second media by:
obtaining metadata related to the video content;

transmitting, via the communication unit, a query to one or more external sources for media related to the obtained metadata, the one or more external sources comprising a second content source; and receiving, via the communication unit, the second media from the second content source in response to the transmitted query.

20. The system of claim 11, wherein the one or more processors are further configured to:

generate a playback plan prior to display of the video content and based on the generated mapping, wherein the playback plan comprises at least one switch from one package encoding to another package encoding; and output the playback plan for display of the video content according to the playback plan.

21. A method comprising:

receiving first media corresponding to a first package encoding of a video content;

identifying a first set of frames of the first media and generating video fingerprints for the first media based on the first set of frames;

receiving second media corresponding to a second package encoding of the same video content;

identifying a second set of frames of the second media and generating video fingerprints for the second media based on the second set of frames;

prior to playback of the video content, generating a mapping for the entire video content comprising alignment information of a first plurality of frames of the first set of frames and a second plurality of frames of the second set of frames based on the generated video fingerprints for the first media and the generated video fingerprints for the second media; and displaying the video content using the first package encoding and switching to displaying the video content using the second package encoding at a switch point determined based on the generated mapping for the entire video content, wherein the switch point is defined by the alignment information, wherein the alignment information of the generated mapping comprises an offset value for each alignment between the first plurality of frames of the first set of frames and the corresponding second plurality of frames of the second set of frames, and wherein the offset value indicates a time difference by which each of the first plurality of frames of the first set of frames is shifted from a corresponding frame of the second plurality of frames of the second set of frames.

22. The method of claim 21, wherein the first set of frames correspond to I-frames of the first package encoding and the second set of frames correspond to I-frames of the second package encoding.

23. The method of claim 21, wherein a first frame of the first set of frames and a second frame of the second set of frames are determined to be aligned when a generated video fingerprint of the first frame and a generated video fingerprint of second frame meet a threshold level of similarity.

24. The method of claim 23, wherein:

the first set of frames correspond to I-frames of the first package encoding and the second set of frames correspond to I-frames of the second package encoding; and the alignment information of the generated mapping comprises shard addresses corresponding to the I-frames of the first package encoding and the I-frames of the second package encoding.

25. The method of claim 21, further comprising assigning a match confidence level value to each alignment of the alignment information of the first plurality of frames of the first set of frames and the second plurality of frames of the second set of frames.

26. The method of claim 25, further comprising assigning a ranking value to the second package encoding based on a total confidence level using the assigned match confidence level values.

27. The method of claim 26, wherein the ranking value is based on a ratio of a number of alignments between the first plurality of frames of the first set of frames and the second plurality of frames of the second set of frames with respect to a total number of the second set of frames.

28. The method of claim 26, wherein:

the first media and second media are received from different content sources;

the second package encoding is one of a plurality of ranked package encodings, wherein one or more of the plurality of ranked package encodings are received from different content sources; and the method further comprises selecting the second package encoding as a highest ranked package encoding for switching an encoding level of the video content during display of the video content.

29. The method of claim 21, wherein:

the first media and second media are received from different content sources;

receiving the second media corresponding to the second package encoding comprises:

obtaining metadata related to the video content;

transmitting a query to one or more external sources for media related to the obtained metadata, the one or more external sources comprising a second content source; and receiving the second media from the second content source in response to the transmitted query.

30. The method of claim 21, further comprising:

generating a playback plan prior to displaying the video content and based on the generated mapping, wherein the playback plan comprises at least one switch from one package encoding to another package encoding; and displaying the video content according to the playback plan.

* * * * *